US010907392B2

(12) United States Patent
Williams et al.

(10) Patent No.: US 10,907,392 B2
(45) Date of Patent: Feb. 2, 2021

(54) PIVOT BIN WITH LIFT ASSIST ASSEMBLY AND METHOD OF USE THEREOF (71) Applicant: C&D Zodiac, Inc., Huntington Beach, CA (US)

(72) Inventors: Corey Williams, Huntington Beach, CA (US); Eric Heimbach, Huntington Beach, CA (US)

(73) Assignee: SAFRAN CABIN INC., Huntington Beach, CA (US)

(*) Notice: Subject to any disclaimer, the term of this patent is extended or adjusted under 35 U.S.C. 154(b) by 365 days.

(21) Appl. No.: 15/878,210

(22) Filed: Jan. 23, 2018

(65) Prior Publication Data

US 2018/0209197 A1 Jul. 26, 2018

Related U.S. Application Data (60) Provisional application No. 62/449,534, filed on Jan. 23, 2017.

(51) Int. Cl.
*E05F 5/08* (2006.01)
*G05G 15/08* (2006.01)
(Continued)

(52) U.S. Cl.
CPC .............. *E05F 5/08* (2013.01); *B64D 11/003* (2013.01); *E05F 1/1008* (2013.01); *E05F 1/1058* (2013.01); *E05F 5/06* (2013.01); *E05F 5/10* (2013.01); *G05G 15/08* (2013.01); *E05Y 2201/212* (2013.01); *E05Y 2201/232* (2013.01); *E05Y 2800/11* (2013.01); *E05Y 2900/502* (2013.01); *E05Y 2900/538* (2013.01); *E05Y 2900/54* (2013.01); *E06B 5/00* (2013.01)

(58) Field of Classification Search
CPC ................................................... B64D 11/003
See application file for complete search history.

(56) References Cited

U.S. PATENT DOCUMENTS

| 747,252 A | 12/1903 | Smith |
| 1,216,899 A | 2/1917 | Weyer |

(Continued)

OTHER PUBLICATIONS

Int'l Search Report and Written Opinion issued in PCT/US2018/014897 dated Mar. 9, 2018.

(Continued)

*Primary Examiner* — Richard R. Green
*Assistant Examiner* — William L Gmoser
(74) *Attorney, Agent, or Firm* — Jeffer Mangels Butler & Mitchell LLP; Brennan C. Swain, Esq.

(57) ABSTRACT

A method of pivoting an aircraft storage bin that includes a bucket that pivots with respect to an upper housing. The method includes pivoting the bucket from a closed position to an intermediate position and placing weight that exceeds a predetermined weight threshold in the bucket, thereby causing the bucket to move to an open position. Movement of the bucket to the open position causes a lift assist unit to activate. A first end of the lift assist unit is connected to the bucket and a second end of the lift assist unit is connected to the upper housing. The method also includes pivoting the bucket from the open position to the closed position. The lift assist unit provides assistance as the bucket is pivoting from the open position to the closed position.

14 Claims, 10 Drawing Sheets (51) Int. Cl.
　　　*B64D 11/00*　　　(2006.01)
　　　*E05F 1/10*　　　(2006.01)
　　　*E05F 5/10*　　　(2006.01)
　　　*E05F 5/06*　　　(2006.01)
　　　*E06B 5/00*　　　(2006.01)

(56) References Cited

U.S. PATENT DOCUMENTS

| | | | |
|---|---|---|---|
| 4,275,942 A * | 6/1981 | Steidl | B64D 11/003 |
| | | | 16/66 |
| 4,490,999 A | 1/1985 | Castle | |
| 4,854,061 A | 8/1989 | Khoshkish | |
| 6,045,204 A * | 4/2000 | Frazier | B64D 11/003 |
| | | | 16/370 |
| 6,938,445 B2 | 9/2005 | Huang | |
| 2002/0175244 A1 | 11/2002 | Burrows et al. | |
| 2004/0245897 A1* | 12/2004 | Stephan | B60R 5/003 |
| | | | 312/246 |
| 2008/0073462 A1* | 3/2008 | Wolf | B64D 11/003 |
| | | | 244/118.1 |
| 2011/0253714 A1 | 10/2011 | Vester et al. | |
| 2014/0246968 A1* | 9/2014 | Geng | B64D 11/003 |
| | | | 312/319.2 |
| 2014/0283336 A1* | 9/2014 | Cloud | B64D 11/003 |
| | | | 16/72 |
| 2016/0002965 A1* | 1/2016 | Janak | E05F 1/14 |
| | | | 16/80 |
| 2016/0075433 A1* | 3/2016 | Eakins | B64D 11/003 |
| | | | 701/49 |
| 2016/0083090 A1 | 3/2016 | Savian | |
| 2017/0137130 A1* | 5/2017 | Kammerer | B64D 11/003 |
| 2018/0134390 A1* | 5/2018 | Rafler | B64D 11/0023 |
| 2018/0258673 A1* | 9/2018 | Schoerkhuber | E05C 17/50 |
| 2018/0319501 A1* | 11/2018 | Schorkhuber | E05F 3/22 |

OTHER PUBLICATIONS

PCT/US2018/014895 International Search Report & Written Opinion dated Mar. 16, 2018.

\* cited by examiner

PIVOT BIN WITH LIFT ASSIST ASSEMBLY AND METHOD OF USE THEREOF

CROSS REFERENCE TO RELATED APPLICATIONS

This application claims the benefit of U.S. Provisional Application No. 62/449,534, filed Jan. 23, 2017, the entirety of which is incorporated herein by reference.

FIELD OF THE INVENTION

The present invention relates generally to a lift assist assembly for an aircraft storage bin assembly.

BACKGROUND OF THE INVENTION

In vehicles, such as aircraft, which include pivoting overhead stowage bins, reducing the hand force required for closing the pivoting overhead stowage bins is a need. Some airlines employ electro-mechanical lift assist that uses sensors and programming algorithms to activate/deactivate an assist spring. However, these can be expensive to produce and certify.

SUMMARY OF THE PREFERRED EMBODIMENTS

In accordance with a first aspect of the present invention there is provided a method of pivoting an aircraft storage bin that includes a bucket that pivots with respect to an upper housing. The method includes pivoting the bucket from a closed position to an intermediate position and placing weight that exceeds a predetermined weight threshold in the bucket, thereby causing the bucket to move to an open position. Movement of the bucket to the open position causes a lift assist unit to activate. A first end of the lift assist unit is connected to the bucket and a second end of the lift assist unit is connected to the upper housing. The method also includes pivoting the bucket from the open position to the closed position. The lift assist unit provides assistance as the bucket is pivoting from the open position to the closed position.

In a preferred embodiment, at least one of the bucket or the upper housing includes a soft stop assembly having a trigger spring associated therewith. The trigger spring is compressed to a predetermined level when the bucket is in the intermediate position and the weight in the bucket exceeds the predetermined weight threshold. Preferably, the soft stop assembly includes an abutment member operatively associated with the trigger spring. The abutment member extends downwardly from the upper housing such that when the bucket is in the intermediate position the abutment member contacts the bucket or upwardly from the bucket such that when the bucket is in the intermediate position the abutment member contacts the upper housing. Preferably, the soft stop assembly includes a damper and the damper extends through the trigger spring.

In a preferred embodiment, the lift assist unit remains activated when the bucket is pivoted from open position to the closed position. The method can also include pivoting the bucket to the open position and removing the weight from the bucket. When this happens the soft stop assembly causes the bucket to pivot to the intermediate position and the lift assist unit is deactivated when the bucket returns to the intermediate position.

In accordance with another aspect of the present invention, there is provided a method of pivoting an aircraft storage bin that includes a bucket that pivots with respect to an upper housing. The method includes pivoting the bucket from a closed position to an intermediate position and placing weight in the bucket. If the weight placed in the bucket exceeds a predetermined weight threshold the bucket moves to an open position. Movement of the bucket to the open position causes a lift assist unit to activate. A first end of the lift assist unit is connected to the bucket and a second end of the lift assist unit is connected to the upper housing. If the weight placed in the bucket does not exceed a predetermined weight threshold the bucket does not move to the open position and the lift assist unit is not activated. The method also includes pivoting the bucket to the closed position. If the weight in the bucket exceeds the predetermined weight threshold, the lift assist unit provides assistance as the bucket is pivoting to the closed position. If the weight in the bucket does not exceed the predetermined weight threshold, the lift assist unit does not provide assistance as the bucket is pivoting to the closed position. Preferably, the lift assist unit remains activated when the bucket is pivoted to the closed position if the weight in the bucket exceeds the predetermined weight threshold.

Generally, the present invention provides the ability to activate/deactivate an assist spring in a pivoting overhead stowage bin using mechanical means. The present invention provides the ability to activate/deactivate the lift assist spring, based on a predetermined load that is applied to the system by luggage. The invention determines when the predetermined load has been applied through a spring-activated soft stop. Once the predetermined load condition is met, a ratcheting mechanism activates the lift assist spring, which aids a user in closing or lifting the bucket. Once the lift assist has aided in the closing of a loaded bucket, the ratcheting mechanism deactivates the lift assist spring, which allows an empty bucket to open completely. The cycle then repeats after the bucket is loaded again with luggage.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-9 show a pivot bin assembly 10 that includes a lift assist system 11. In particular, the invention can be used on commercial passenger aircraft. However, this is not a limitation on the present invention and the pivot bin assembly and lift assist system 11 can be used elsewhere.

The present invention is directed to an aircraft storage bin 10 that includes an upper housing 12 and a bucket 14 that is movable with respect to the upper housing 12. The bucket 14 may pivot, translate or otherwise move in any way with respect to the upper housing 12 between a closed position, an intermediate position, and an open or fully open position so that luggage or other items can be positioned in the bin interior that is defined by the bucket 14 and the upper housing 12. The present invention aircraft storage bin 10 employs a "clamshell design," such as the ones disclosed in U.S. Pat. Nos. 8,955,805 and 9,789,963 (the "'805 and '963 patents"), the entireties of which are incorporated by reference herein. In the "clam shell" configuration the side walls of the bucket 14 abut or align with the side walls of the upper housing. However, it will be appreciated by those of ordinary skill in the art that the bucket can have the shape of any bucket used in aircraft storage bins. For example, the bucket can have a C-shaped cross section with a top and sides that do not abut the upper housing, similar to that taught in U.S. Patent Publication No. 2011/0139929, the entirety of which is incorporated by reference herein. Furthermore, in a preferred embodiment, the storage bin 10 is used in a passenger aircraft. However, this is not a limitation on the present invention and the bin can be used for storage in other places and situations.

Figure 1:
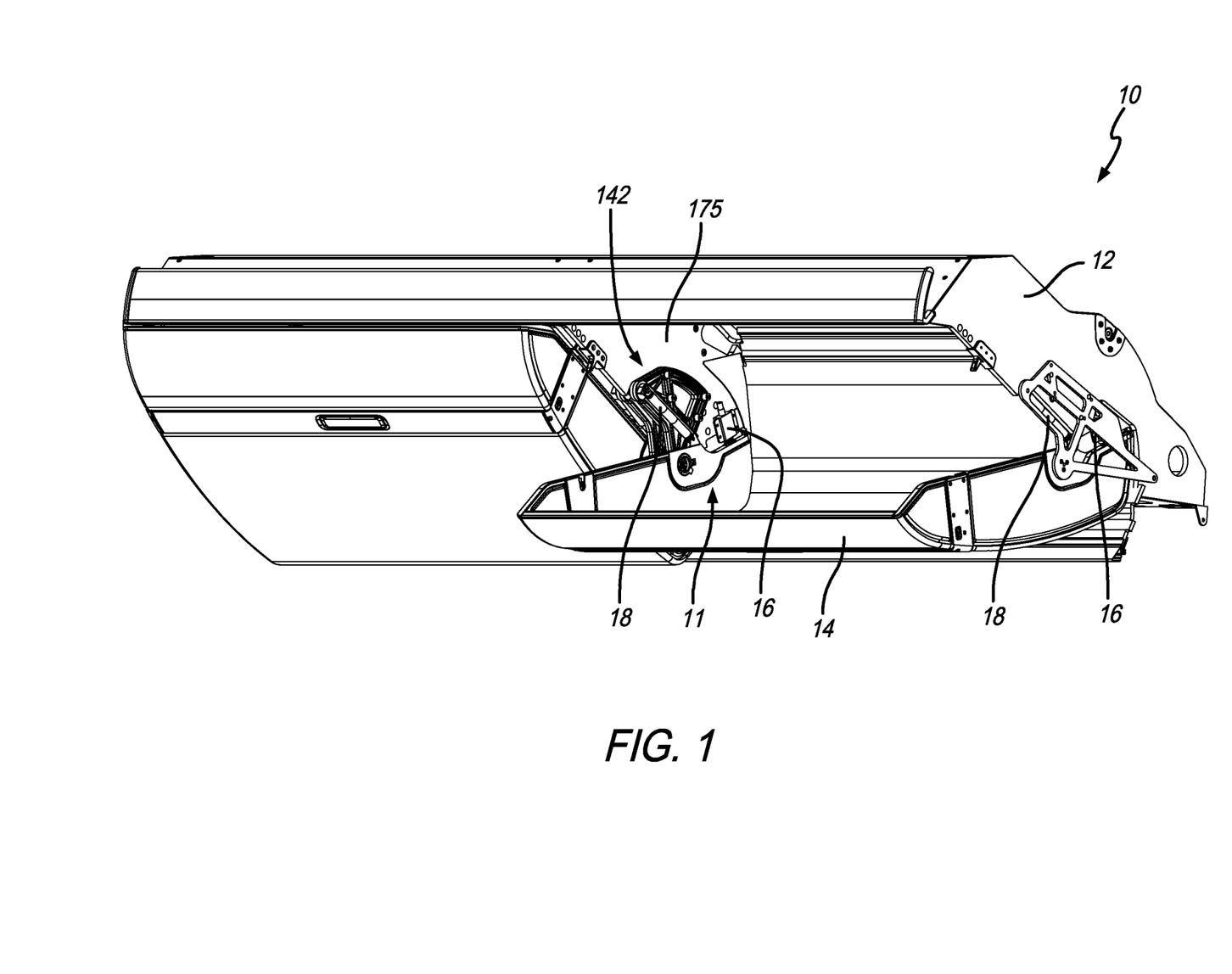
FIG. 1 is a perspective view of a dual pivot bin assembly which incorporates the lift assist system of the present invention.

As shown in FIG. 1, in a preferred embodiment, the storage bin 10 includes a soft stop assembly or soft stop 16 and a lift assist mechanism or unit 18 that aids a user in closing the bucket 14 after a predetermined load threshold has been reached (after a predetermined weight of luggage has been placed in the bucket). The soft stop assembly 16 and lift assist unit 18 are referred to together herein as the lift assist system 11. In a preferred embodiment, the soft stop assembly 16 is attached to the upper housing 12 or a component thereof (all of which are generally referred to herein as the "upper housing"), such as the inner plate 175 of the clevis assembly 142 and is aligned with the bucket or a component thereof (all of which are referred to herein generally as the "bucket") so that it contacts the bucket in the intermediate and open positions, as discussed below. In another embodiment, the soft stop assembly 16 can be attached to the bucket or to a component thereon.

Figure 2:
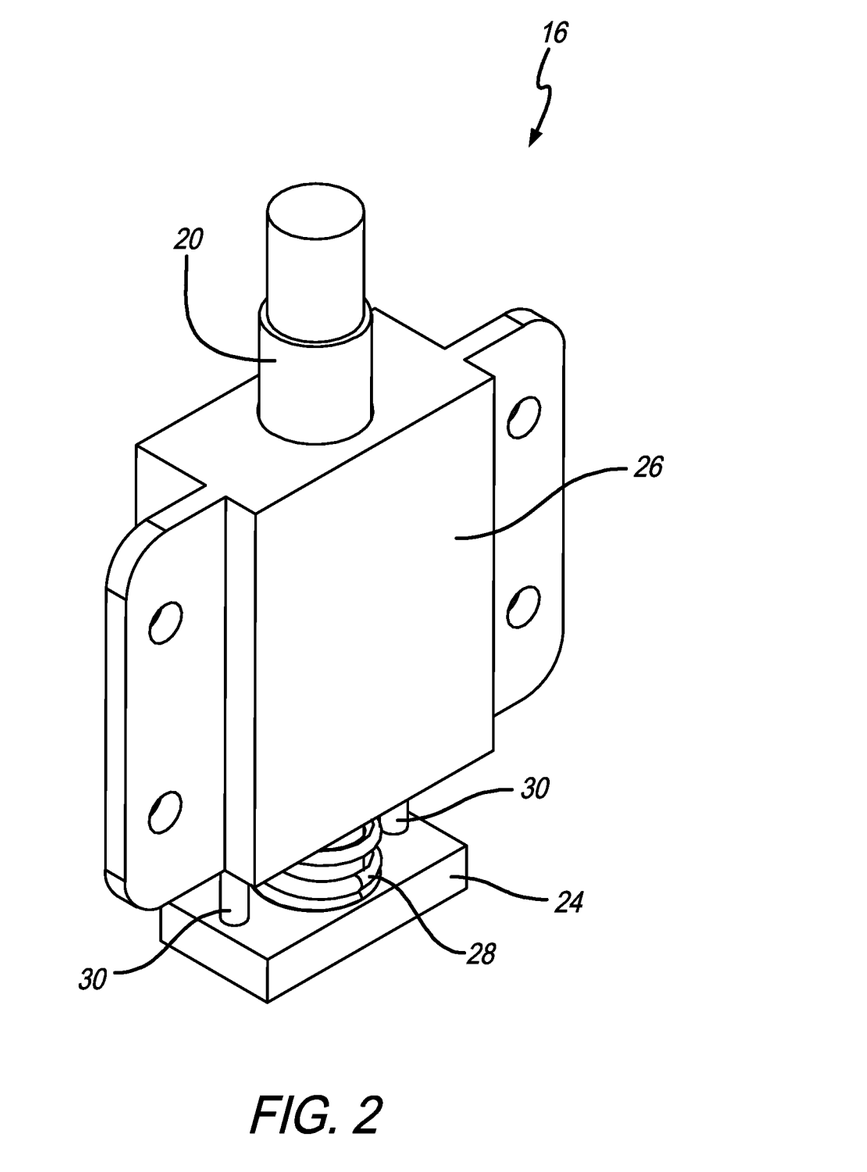
FIG. 2 is a perspective view of the soft stop assembly.
Figure 3:
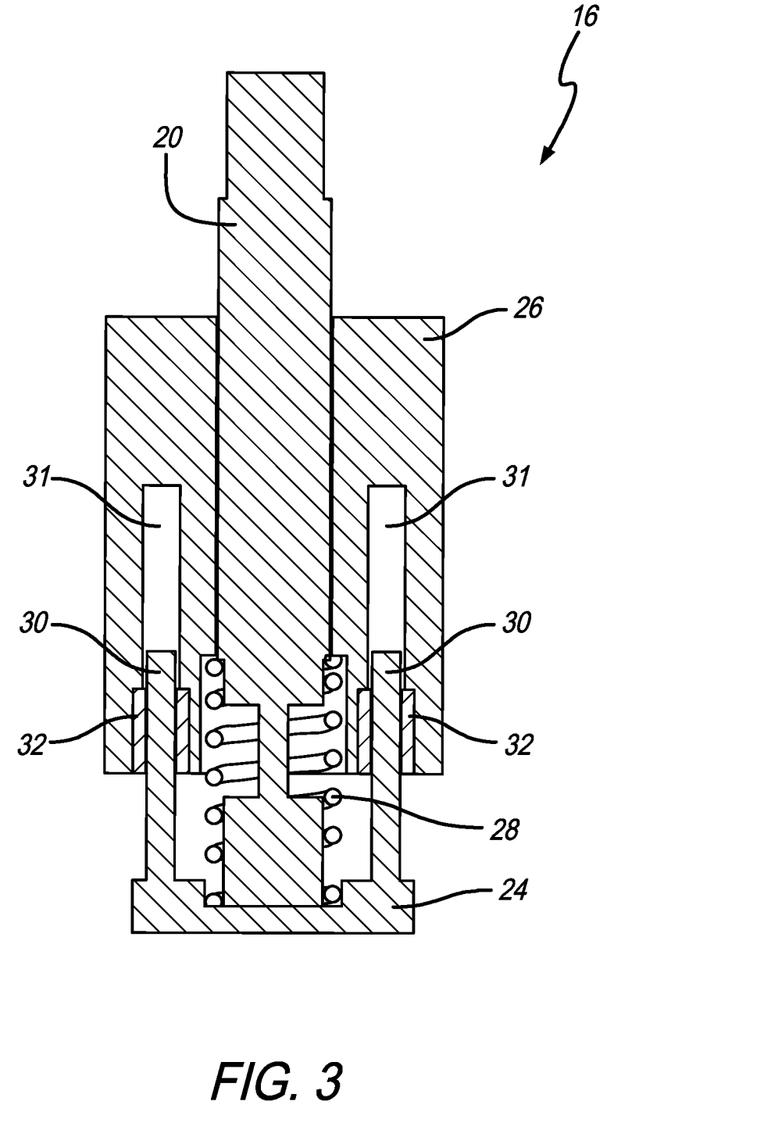
FIG. 3 is a cross-sectional view of the soft stop assembly.
Figure 4:
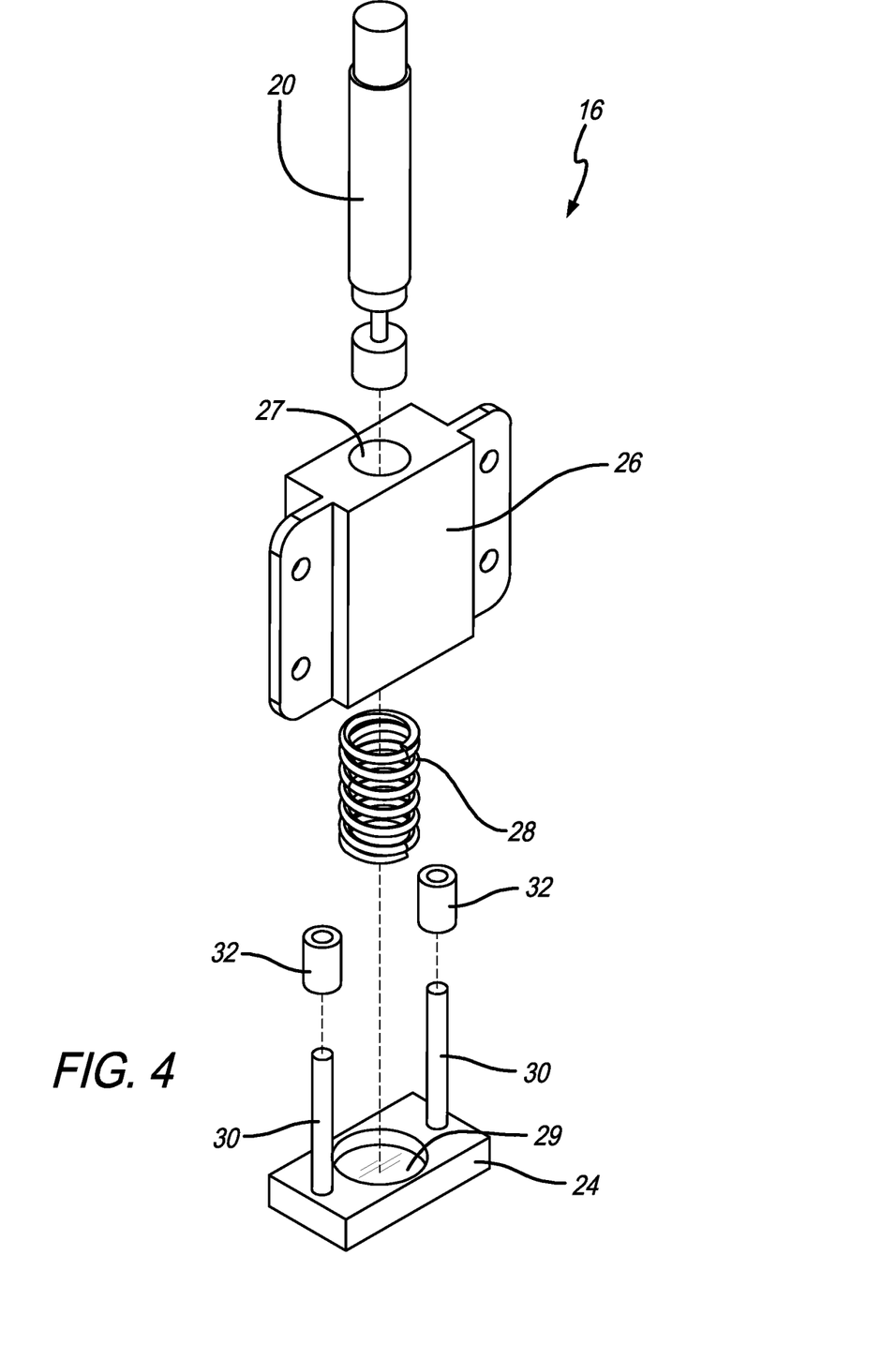
FIG. 4 is an exploded view of the soft stop assembly.

FIGS. 2-4 show the soft stop assembly 16 in detail. In a preferred embodiment, the soft stop assembly 16 includes an abutment member 24 extending generally downwardly and into open space so that it can abut the bucket. Preferably, the soft stop assembly 16 also includes a housing 26 that defines an opening 27 through which extends a dashpot or damper 20 and also includes a trigger spring 28 associated with, connected to or otherwise abutting the abutment member 24. Preferably, the trigger spring 28 is seated in a recess 29 in the rear surface of the abutment member 24. In a preferred embodiment, the soft stop assembly 16 also includes two guide rods 30 that extend into elongated recesses 31 in the housing 26 (that may include bushings 32 therein. The lift assist unit 18 is attached to the upper housing 12 and extends to and is attached to the bucket 14.

Figure 5A:
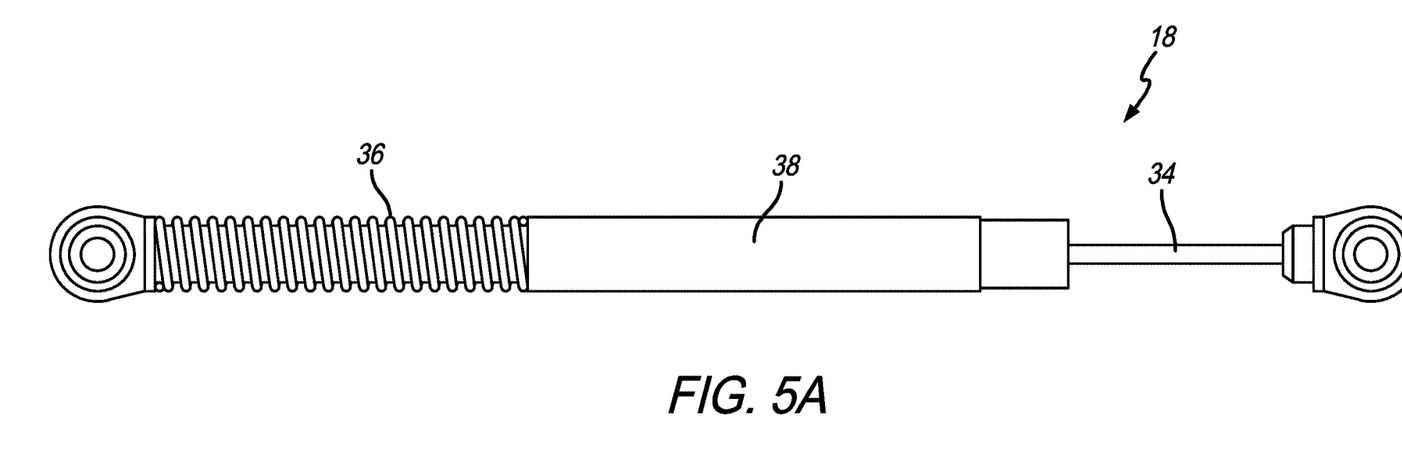
FIG. 5A is an elevational view of a lift assist unit in the deactivated position.
Figure 5B:
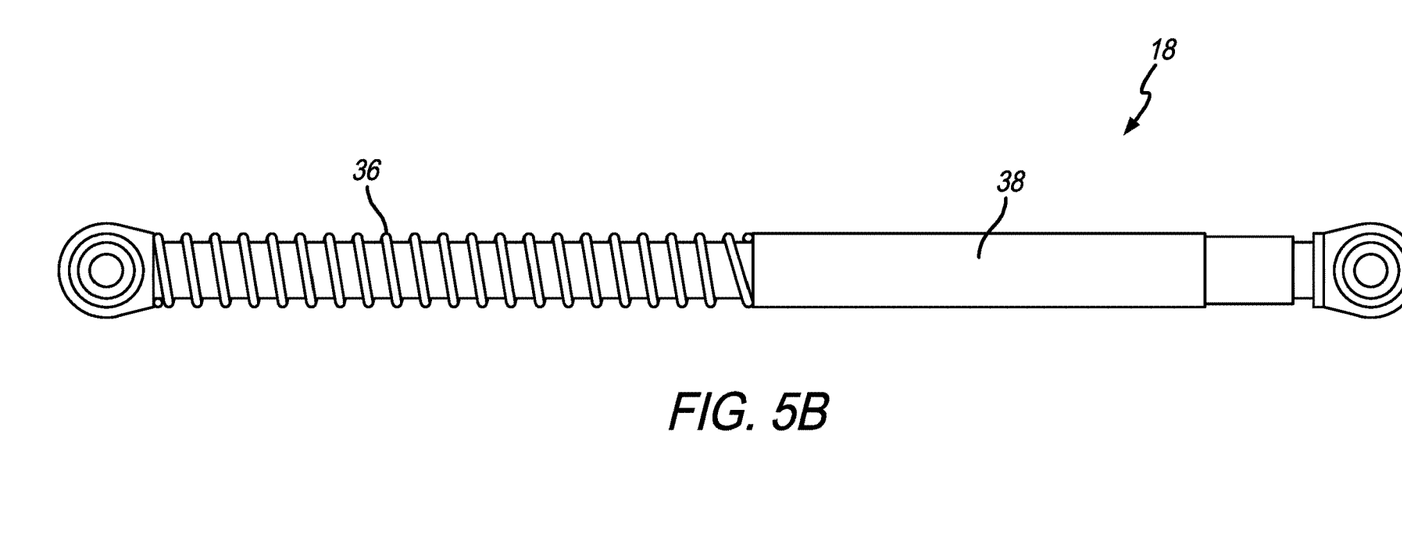
FIG. 5B is an elevational view of the lift assist unit in the activated position.

FIGS. 5A and 5B show an exemplary lift assist unit 18 that can be used in the lift assist system 11. FIG. 5A shows the lift assist unit 18 deactivated. In this mode, the rod 34 extends and contracts on its own when the bucket is opened and closed (between the closed and intermediate positions). In the deactivated position, the assist spring 36 remains compressed between the end of the unit and the housing 38. In a preferred embodiment, the assist spring is a compression spring. FIG. 5B shows the lift assist unit activated (ready to provide lift assist). In this mode, the assist spring 36 pushes on housing 38 to provide lift assist (when pivoting from the open position to the closed position). The housing 38 includes a ratchet mechanism therein that is activated. Once the ratcheting mechanism in the housing is activated (when the trigger spring is fully compressed) the housing is released to move upwardly (to the right as oriented in FIG. 13) as a result of the force from the assist spring. This allows the assist spring to help close the bucket (by pulling the bucket upwardly). When the ratcheting mechanism is deactivated the housing is held in the position shown in FIG. 5A. The lift assist unit 18 can be designed to pull (expand) or push (contract) to provide lift assist. It will be appreciated that in a preferred embodiment, the ratcheting mechanism works similarly to a click pen. Mechanisms that could be used are taught in U.S. Pat. Nos. 9,333,794 and 3,819,282, the entireties of which are incorporated herein by reference. It will be appreciated that the lift assist unit 18 is preferably remote from the soft stop assembly.

FIGS. 6-10 depict the method steps for using the lift assist system 11. As shown in the drawings, the bucket 14 is movable between a closed position (first position), an intermediate position (second position), and a fully open position (third position). In another description of the invention, the second position can be considered the open position and the third position can be described as the lift assist position.

Figure 6:
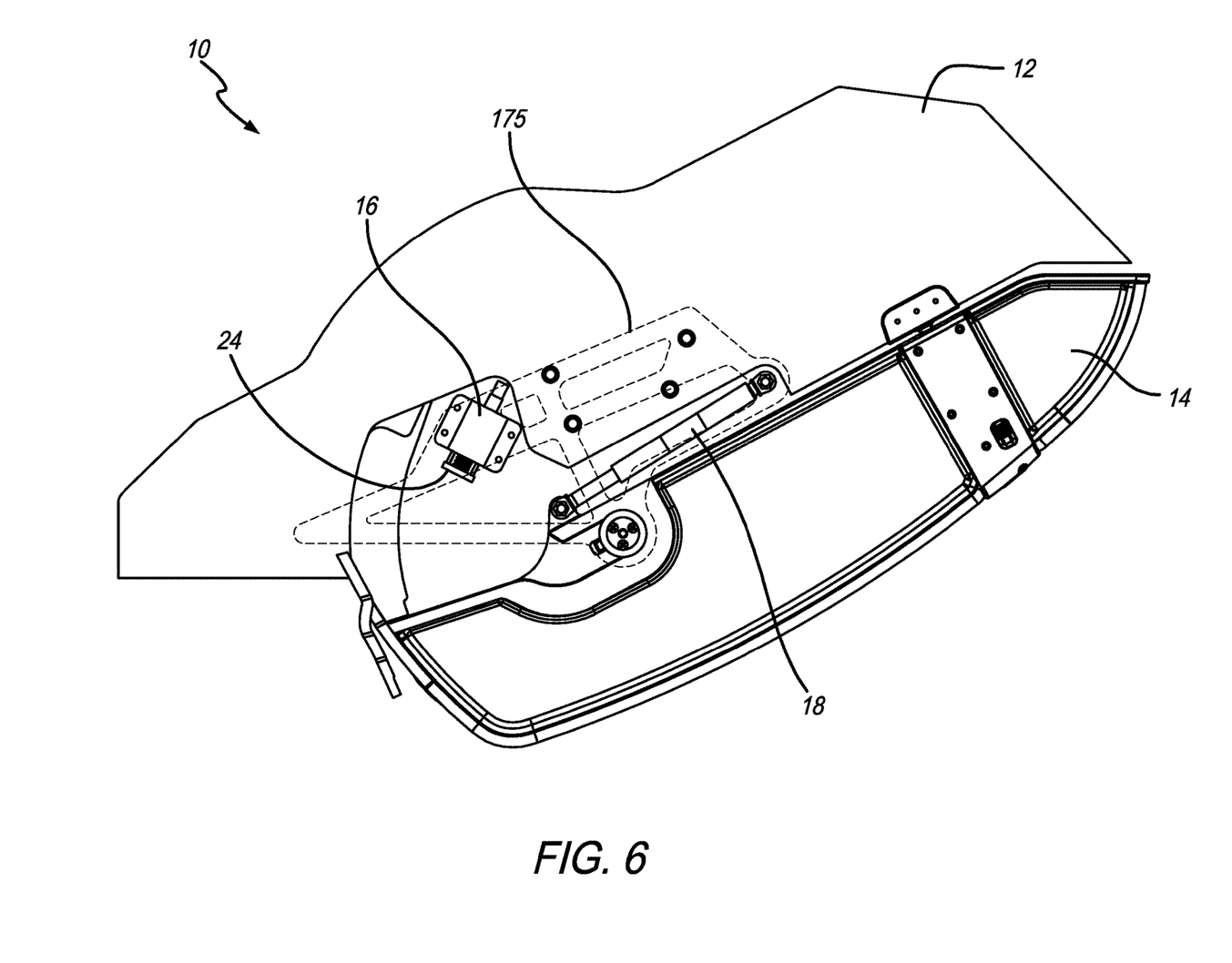
FIG. 6 is a side elevational view of the pivot bin assembly of FIG. 1 showing the bucket in the closed position.
Figure 7:
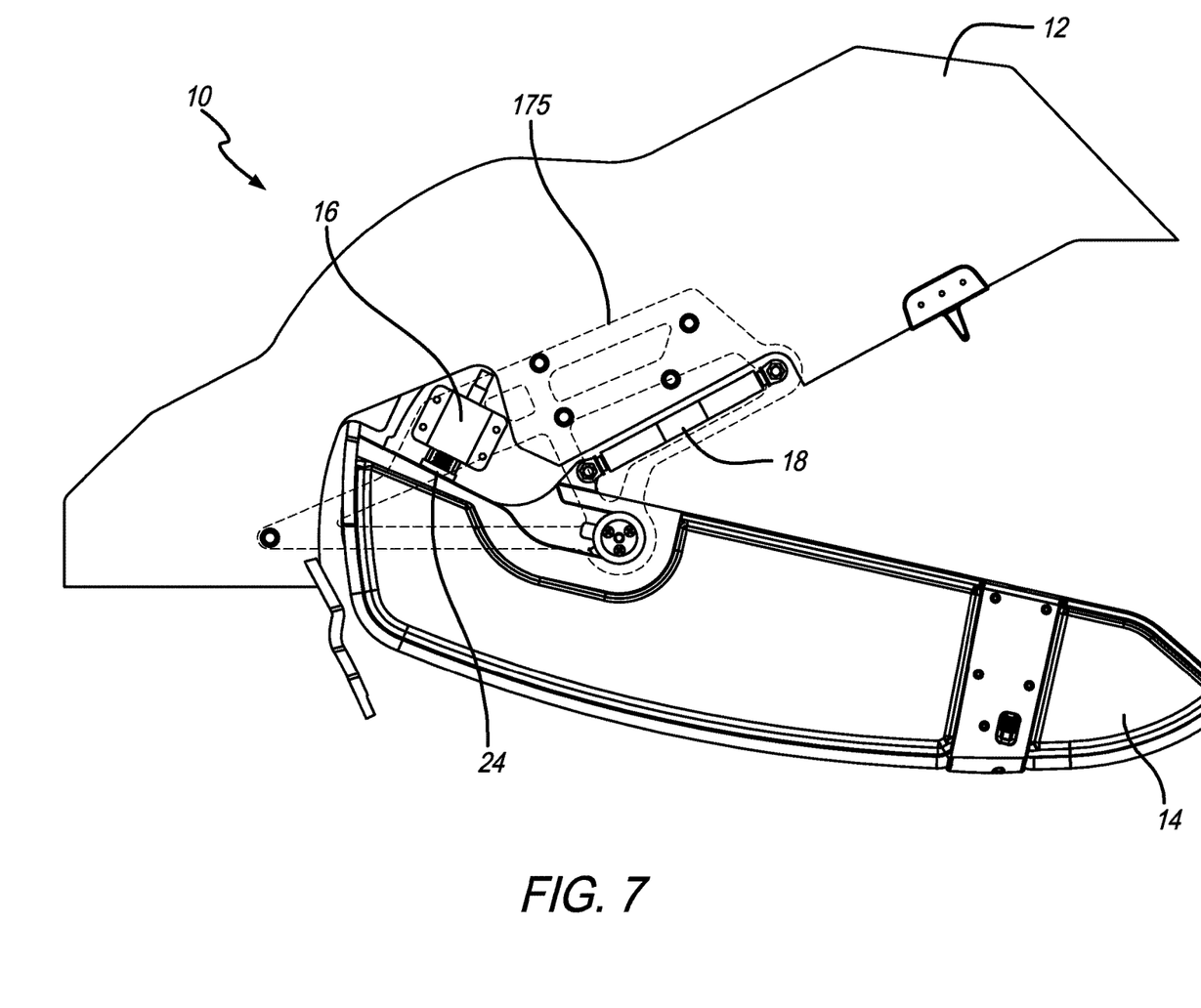
FIG. 7 is a side elevational view of the pivot bin assembly of FIG. 1 showing the bucket in the intermediate position.
Figure 8:
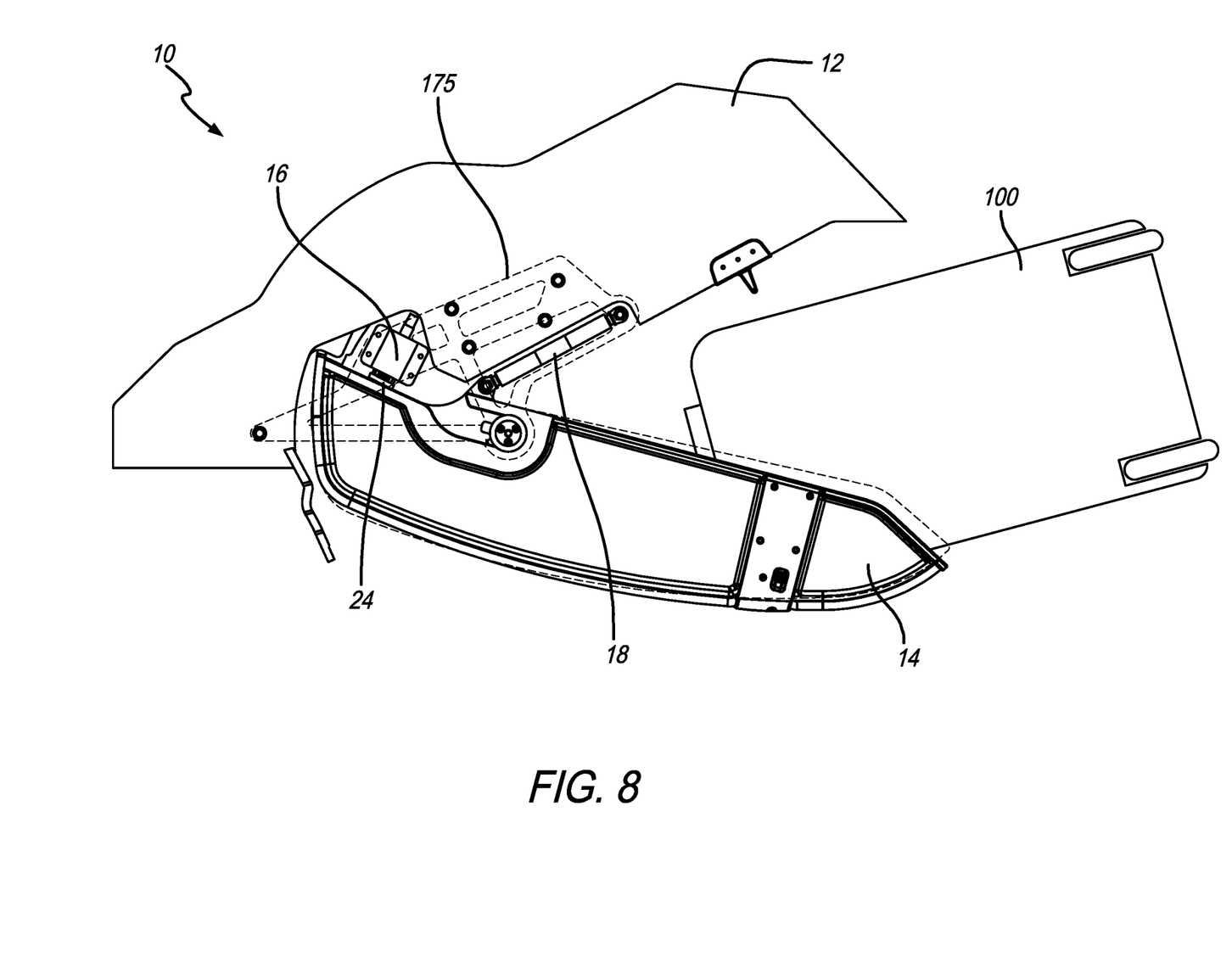
FIG. 8 is a side elevational view of the pivot bin assembly of FIG. 1 showing the bucket just past the intermediate position with luggage entering the bin interior.

FIG. 6 shows the bucket or bin in the closed position. Generally, when the latch is activated to open the empty bucket 14, the bucket moves from the closed position to the intermediate position by gravity (and is preferably damped). The intermediate position is shown in FIG. 7 and is also referred to herein as the starting condition. In this position, the empty bucket 14 rests against the soft stop assembly 16 (a surface on the bucket 14 rests against the abutment member 24. In other words, the abutment member 24 stops the empty bucket from opening any further. FIG. 8 shows passenger luggage 100 being loaded into the bucket 14 and the bin interior (note that trigger spring 28 has started to compress and the bucket has started to pivot downwardly due to the weight of the luggage). In a preferred embodiment, the soft stop assembly 16 includes the damper 20 therein that acts as a shock absorber to prevent the spring in the lift assist unit 18 from activating prematurely as a result of a bag being dropped onto the lip of the bucket. In other words, the damper 20 keeps the trigger spring 28 in the soft stop assembly 16 from fully compressing to the point where the lift assist is activated (described below), for example, when a passenger drops a bag on the bucket and the trigger spring 28 partially compresses, but the bag is not heavy enough to activate the lift assist.

Figure 9:
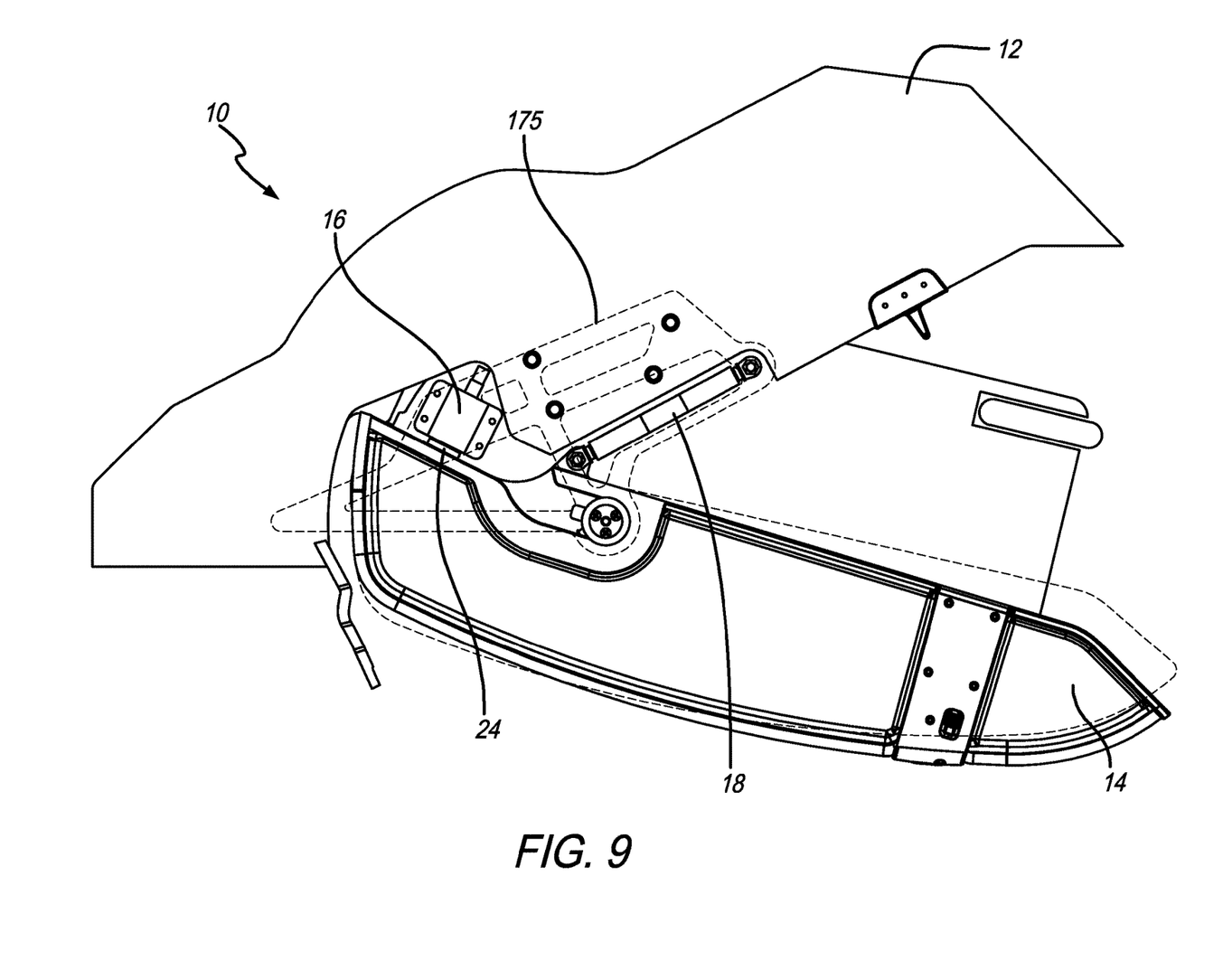
FIG. 9 is a side elevational view of the pivot bin assembly of FIG. 1 showing the bucket in the open position.

FIG. 9 depicts a scenario where the bin or bucket requires lift assist. In this situation, enough weight has been placed in the bucket 14 that a predetermined threshold has been reached or exceeded. As shown in FIG. 9, when a user places luggage 100 that weighs more than the predetermined weight threshold in the bucket, the trigger spring 28 in the soft stop assembly 16 is fully compressed (or at least compressed to a predetermined level) so that the bin is in the fully open position. At this position, the lift assist spring 36 is now activated or engaged in the lift assist unit 18. In other words, once the trigger spring 28 has been compressed to the predetermined level and the bucket 14 has rotated downwardly to the fully open position (the intermediate position is shown in hidden lines in FIG. 9), and the assist spring in the lift assist unit 18 is engaged or activated.

Once the lift assist is engaged, the bucket 14 can then be moved to the closed position (bypassing the intermediate position) by a user with the assistance of the lift assist (the amount of force the user needs to place on the bucket to close it is reduced because the assist spring is placing a force on the bucket). In a preferred embodiment, the lift assist is provided over the entire closing arc of the bucket. In another embodiment, the lift assist may only be provided over a portion of the closing arc. At this point, the lift assist unit (and, in particular, the spring therein) 18 is still activated and ready to provide lift assist.

If a passenger requires an item from the bin during flight (while it still includes more weight than the predetermined weight threshold) and opens the bucket, the bucket returns to the fully open position (by gravity) with the lift assist still activated (bypassing the intermediate position). When the loaded bucket is closed again the lift assist is not deactivated, but once again provides closing assistance.

In the situation where the loaded bucket is opened (e.g., after flight) and the luggage is then removed therefrom, as the passenger luggage is removed from the bucket, the trigger spring 28 extends (because the spring force is no longer overcome) and the bucket returns to the intermediate position (starting condition). When this happens, the lift assist is disengaged. In other words, when the bucket is opened again (after being closed), the lift assist unit 18 is deactivated.

Figure 10:
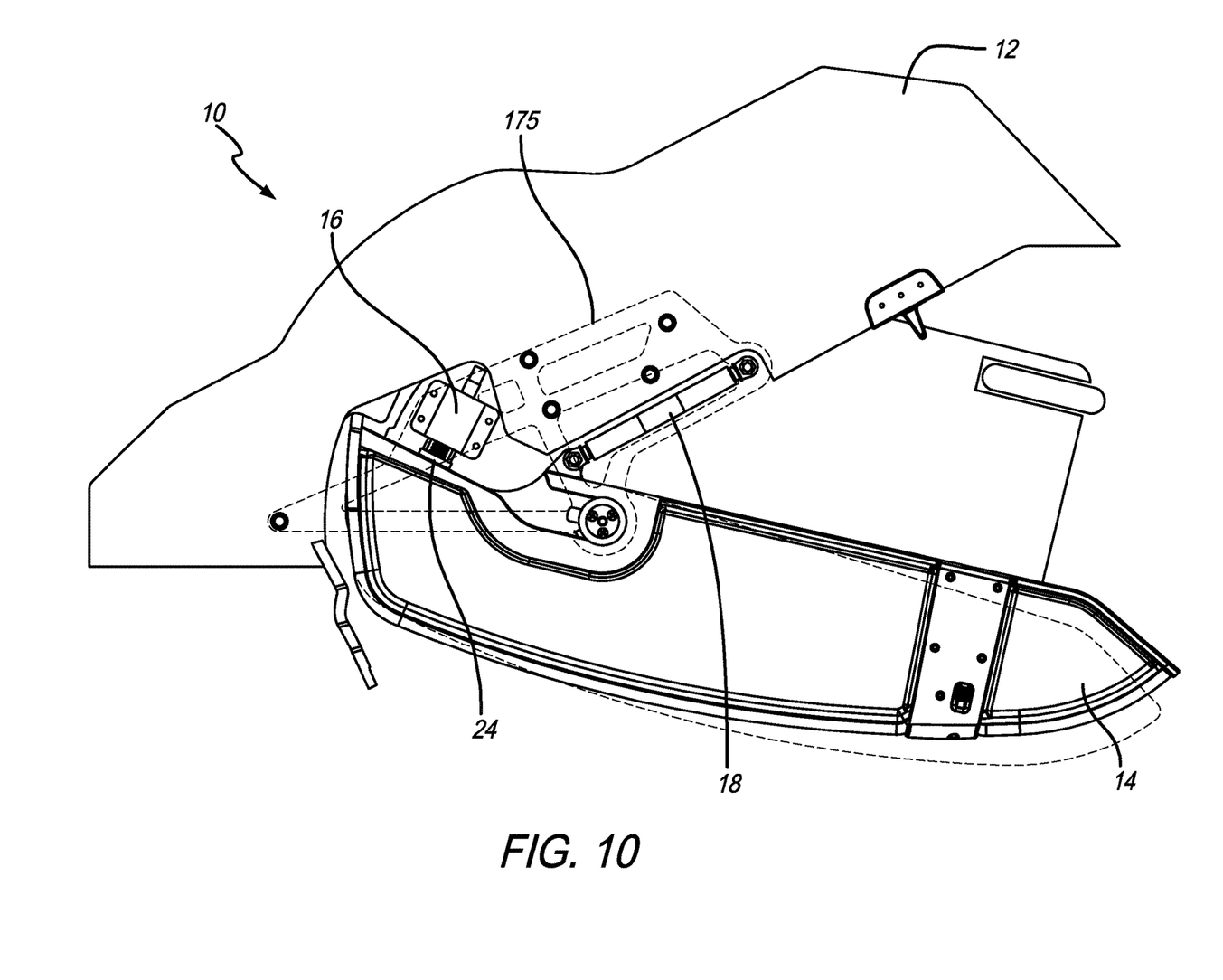
FIG. 10 is a side elevational view of the pivot bin assembly of FIG. 1 showing the bucket in the intermediate position and with luggage therein that does not weigh more than the predetermined threshold.

Next a scenario where the bin or bucket do not require lift assist will be described. In this situation, as shown in FIG. 10, luggage 100 has been placed in the bucket, but the luggage 100 does not weigh enough to meet or exceed the predetermined threshold or weight. In this scenario, the trigger spring 28 in the soft stop assembly 16 is not fully compressed and does not hit the hard stop or reach the predetermined level. Therefore, the lift assist unit 18 remains deactivated. The bucket can then be closed without the assistance of the lift assist unit 18. If a passenger requires an item from the bin 10 during flight and opens the bucket 14, the bucket 14 returns to the intermediate position with the lift assist still deactivated. When the passenger luggage 100 is removed from the bucket (e.g., after flight), the trigger spring 28 extends fully and the bucket returns to the intermediate position (starting condition). It will be appreciated that in this scenario, the fully open or third position is never reached.

In an embodiment, where the lift assist system 11 is used with a clevis assembly 142 (as described in the '805 and '963 patents and shown in FIG. 1), the lift assist unit 18 is positioned between the outer and inner plates of the clevis assembly and extends between the side panel of the upper housing 12 and the bucket 14. The soft stop assembly 16 is secured to a component of the upper housing 12.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of pivoting an aircraft storage bin, wherein the aircraft storage bin includes a bucket that pivots with respect to an upper housing, the method comprising the steps of:
    pivoting the bucket from a closed position to an intermediate position, wherein a lift assist unit extends between the bucket and the upper housing, wherein the lift assist unit includes a lift assist spring and a housing, wherein the lift assist spring extends between a first end of the lift assist unit and the housing, wherein at least one of the bucket or the upper housing includes a soft stop assembly having a trigger spring associated therewith, wherein the soft stop assembly includes an abutment member operatively associated with the trigger spring, wherein the abutment member extends downwardly from the upper housing such that when the bucket is in the intermediate position the abutment member contacts the bucket or upwardly from the bucket such that when the bucket is in the intermediate position the abutment member contacts the upper housing,
    placing weight that exceeds a predetermined weight threshold in the bucket, thereby causing the bucket to move to an open position, wherein the trigger spring is compressed axially when the bucket pivots to the open position, wherein the trigger spring is compressed to a predetermined level when the bucket is in the intermediate position and the weight in the bucket exceeds the predetermined weight threshold, wherein movement of the bucket to the open position causes a ratcheting mechanism in the lift assist unit to activate, thereby releasing the housing to move and provide lift assist as a result of the force from the lift assist spring, and
    pivoting the bucket from the open position to the closed position, wherein the lift assist unit provides assistance as the bucket is pivoting from the open position to the closed position.

2. The method of claim 1 wherein the soft stop assembly includes a damper.

3. The method of claim 2 wherein the damper extends axially through a center opening of the trigger spring.

4. The method of claim 1 wherein the lift assist unit remains activated when the bucket is pivoted from open position to the closed position.

5. The method of claim 1 further comprising the steps of pivoting the bucket to the open position and removing the weight from the bucket, wherein the soft stop assembly causes the bucket to pivot to the intermediate position.

6. The method of claim 5 wherein the ratcheting mechanism in the lift assist unit is deactivated when the bucket returns to the intermediate position.

7. A method of pivoting an aircraft storage bin, wherein the aircraft storage bin includes a bucket that pivots with respect to an upper housing, the method comprising the steps of:
    (a) pivoting the bucket from a closed position to an intermediate position, wherein a lift assist unit extends between the bucket and the upper housing, wherein the lift assist unit includes a lift assist spring and a housing, wherein the lift assist spring extends between a first end of the lift assist unit and the housing,
    (b) placing weight in the bucket,
    (c) if the weight placed in the bucket exceeds a predetermined weight threshold the bucket moves to an open position, wherein at least one of the bucket or the upper housing includes a soft stop assembly having a trigger spring associated therewith, wherein the trigger spring is compressed to a predetermined level when the bucket is in the intermediate position and the weight in the bucket exceeds the predetermined weight threshold, wherein the soft stop assembly includes an abutment member operatively associated with the trigger spring, wherein the abutment member extends downwardly from the upper housing such that when the bucket is in the intermediate position the abutment member contacts the bucket or upwardly from the bucket such that when the bucket is in the intermediate position the abutment member contacts the upper housing, wherein the trigger spring is compressed axially when the bucket pivots to the open position, wherein movement of the bucket to the open position causes a ratcheting mechanism in the lift assist unit to activate, thereby releasing the housing to move and provide lift assist as a result of the force from the lift assist spring, (d) if the weight placed in the bucket does not exceed a predetermined weight threshold the bucket does not move to the open position and the ratcheting mechanism in the lift assist unit is not activated, and (e) pivoting the bucket to the closed position, wherein if the weight in the bucket exceeds the predetermined weight threshold, the lift assist unit provides assistance as the bucket is pivoting to the closed position, and wherein if the weight in the bucket does not exceed the predetermined weight threshold, the lift assist unit does not provide assistance as the bucket is pivoting to the closed position.

8. The method of claim 7 wherein soft stop assembly includes a damper.

9. The method of claim 8 wherein the wherein the damper extends axially through a center opening of the trigger spring.

10. The method of claim 7 wherein the ratcheting mechanism in the lift assist unit remains activated when the bucket is pivoted to the closed position if the weight in the bucket exceeds the predetermined weight threshold.

11. A method of pivoting an aircraft storage bin, wherein the aircraft storage bin includes a bucket that pivots with respect to an upper housing, the method comprising the steps of:

pivoting the bucket from a closed position to an intermediate position, wherein a lift assist unit extends between the bucket and the upper housing, wherein the lift assist unit includes a lift assist spring and a housing, wherein the lift assist spring extends between a first end of the lift assist unit and the housing, wherein at least one of the bucket or the upper housing includes a soft stop assembly having a trigger spring associated therewith, wherein the soft stop assembly includes a damper that extends axially through a center opening of the trigger spring, wherein the soft stop assembly includes an abutment member operatively associated with the trigger spring, and wherein the abutment member extends downwardly from the upper housing such that when the bucket is in the intermediate position the abutment member contacts the bucket or upwardly from the bucket such that when the bucket is in the intermediate position the abutment member contacts the upper housing, wherein the soft stop assembly includes a housing that defines an opening, wherein the damper and trigger spring extend through the opening, and wherein the trigger spring abuts the abutment member, placing weight that exceeds a predetermined weight threshold in the bucket, thereby causing the bucket to move to an open position, wherein the trigger spring is compressed to a predetermined level when the bucket is in the intermediate position and the weight in the bucket exceeds the predetermined weight threshold, wherein movement of the bucket to the open position causes a ratcheting mechanism in the lift assist unit to activate, thereby releasing the housing to move and provide lift assist as a result of the force from the lift assist spring, and pivoting the bucket from the open position to the closed position, wherein the lift assist unit provides assistance as the bucket is pivoting from the open position to the closed position.

12. The method of claim 11 wherein the soft stop assembly includes two guide rods that extend from the abutment member and into elongated recesses defined in the housing.

13. The method of claim 12 wherein the trigger spring is seated in a recess defined in the abut member.

14. The method of claim 1 wherein the lift assist unit includes a rod that is coaxially received in the housing, wherein when the ratcheting mechanism in the lift assist unit is not activated, the rod extends out of the housing or contracts into the housing as the bucket is moved between the closed position and the intermediate position.

* * * * *